US012566637B2

(12) United States Patent
Peercy et al.

(10) Patent No.: US 12,566,637 B2
(45) Date of Patent: Mar. 3, 2026

(54) SYSTEM AND METHODS FOR SUBDIVIDING AN UNKNOWN TREE FOR EXECUTION OF OPERATIONS BY MULTIPLE COMPUTE ENGINES

(71) Applicant: KOMPRISE INC., Campbell, CA (US)

(72) Inventors: Michael Peercy, Campbell, CA (US); Ishani Sheth, Campbell, CA (US); Kumar Goswami, Campbell, CA (US); Mohit Dhawan, Campbell, CA (US)

(73) Assignee: Komprise Inc., Campbell, CA (US)

( * ) Notice: Subject to any disclaimer, the term of this patent is extended or adjusted under 35 U.S.C. 154(b) by 585 days.

(21) Appl. No.: 17/504,851

(22) Filed: Oct. 19, 2021

(65) Prior Publication Data

US 2022/0121500 A1 Apr. 21, 2022

Related U.S. Application Data

(60) Provisional application No. 63/093,448, filed on Oct. 19, 2020.

(51) Int. Cl.
*G06F 9/50* (2006.01)
*G06F 16/18* (2019.01)

(52) U.S. Cl.
CPC ............ *G06F 9/5044* (2013.01); *G06F 9/505* (2013.01); *G06F 16/1865* (2019.01)

(58) Field of Classification Search
None
See application file for complete search history.

(56) References Cited

U.S. PATENT DOCUMENTS

| | | | | | |
|---|---|---|---|---|---|
| 8,078,653 | B1 * | 12/2011 | Bisson | .................. | G06F 16/164 |
| | | | | | 707/829 |
| 2012/0110370 | A1 * | 5/2012 | Havivi | ................ | G06F 11/0706 |
| | | | | | 707/827 |
| 2015/0363239 | A1 * | 12/2015 | Hsu | ........................ | G06F 9/5033 |
| | | | | | 718/104 |
| 2021/0141763 | A1 * | 5/2021 | Yeager | .............. | G06F 16/24557 |

* cited by examiner

*Primary Examiner* — Eric C Wai
(74) *Attorney, Agent, or Firm* — Weiss & Moy, PC; Jeffrey D. Moy

(57) ABSTRACT

An electronic system for subdividing an unknown directory tree for execution of operations on directories and files therein has a plurality of computer engines. Each computer engine has a processor. A memory is coupled to the processor, the memory storing program instructions. The program instructions when executed by a processor of a first of the computer engines, causes the processor of the first computer engine to: enumerate a file system comprising directories and files into ordered lists of tasks; subdivide the lists of tasks into a number of subtasks, each of the subtasks being smaller in size than each of the tasks; and deliver the subtasks to a plurality of different computer engines.

9 Claims, 4 Drawing Sheets

12, 16, 20

SYSTEM AND METHODS FOR SUBDIVIDING AN UNKNOWN TREE FOR EXECUTION OF OPERATIONS BY MULTIPLE COMPUTE ENGINES

RELATED APPLICATIONS

This patent application is related to U.S. Provisional Application No. 63/093,448 filed Oct. 19, 2020, entitled "SYSTEM AND METHODS FOR SUBDIVIDING AN UNKNOWN TREE FOR EXECUTION OF OPERATIONS BY MULTIPLE COMPUTE ENGINES" in the name of the same inventors, and which is incorporated herein by reference in its entirety. The present patent application claims the benefit under 35 U.S.C § 119(e).

TECHNICAL FIELD

The present application generally relates to metadata, and more specifically, to a system and method for the useful analysis and operations on the metadata and data of files in file storage systems and objects in object storage systems where those files and objects exist in a tree of directories or prefixes.

BACKGROUND

Frequently, in operations such as copying all files from one file server, file volume, or file share to another, the amount of data to transfer may be great while the time allowed may be small. A single compute engine—for example, and without limitation, a thread, a collection of threads, a process, a collection of processes, or a standalone computer—generally cannot do all the work quickly enough. In this case one may need to employ parallel processing across multiple compute engines.

The hardest case of compute engines to employ in parallel is generally separate computers that do not share memory or disk because the specific work these computers are assigned must be communicated to them. If the quantum of work is too small, the time taken for that communication could overwhelm the time taken to actually do the operation on the assigned work. If the quantum of work is too large, then all but one computer could have finished their assigned work while the entire task is not complete because one computer is still working on its larger assigned work.

If the work—hereafter known as a task—can be subdivided in advance, the work may be able to be assigned as subtasks of similar size to the separate computers. However, it is likely that the structure and size of the data to be worked on is unknown and that it therefore cannot be subdivided in advance. In particular, the contents of a directory tree may be discovered only as the tree is traversed from the root nodes toward the leaf nodes. Furthermore, it is possible that the data must be processed in order because, for example, parent directories must precede subdirectories or files. In this case the data must be subdivided on the fly. This subdivision must be effective and tolerant of all sorts of data structures that are encountered. In other words, it should be dynamic and not static.

Furthermore, because the work must be sent to another computer, the work cannot be subdivided into too small quanta or the subdivisions may be inefficient. The work should be sent in the largest amounts possible in order to be maximally efficient.

Current state of the art solves this problem by determining the structure and size of subtasks in a prior step. However, this may require time and space and add complexity to the total effort.

The need to subdivide an unknown tree of directories and files in a file server or prefixes and objects in an object store exists for operations including, without limitation, copy, move, moving while leaving dynamic links in the style of U.S. Pat. No. 10,198,447, delete, as well as similar operations.

Without loss of generality, the present invention applies to objects and prefixes in an object store just as it applies to files and directories in a file server. Hence directory can be used to mean directory or prefix and file can be used to mean file or object.

While the present invention in its present application is designed for separate computers, it can be applied in the case of separate compute engines of any type, including, without limitation, threads, collections of threads, processes, collections of processes, services, and collections of services.

SUMMARY

In accordance with one embodiment, an electronic system for subdividing an unknown directory tree for execution of operations on the directories and files therein is disclosed. The electronic system has a plurality of computer engines. Each computer engine has a processor. A memory is coupled to the processor, the memory storing program instructions. The program instructions, when executed by a processor of a first of the computer engines, cause the processor of the first computer engine to: enumerate a file system comprising directories and files into ordered lists of tasks; subdivide the lists of tasks into a number of subtasks, each of the subtasks being smaller in size than each of the tasks; and deliver the subtasks to a plurality of different computer engines.

In accordance with one embodiment, an electronic system for subdividing an unknown directory tree for execution of operations on the directories and files therein is disclosed. The electronic system has a processor. A memory is coupled to the processor, the memory storing program instructions, wherein the program instructions when executed by the processor, causes the processor to: enumerate a file system comprising directories and files into ordered lists of tasks; subdivide the lists of tasks into a number of subtasks, each of the subtasks being smaller in size than each of the tasks; and deliver the subtasks to a plurality of different computer engines.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

Figure 1:
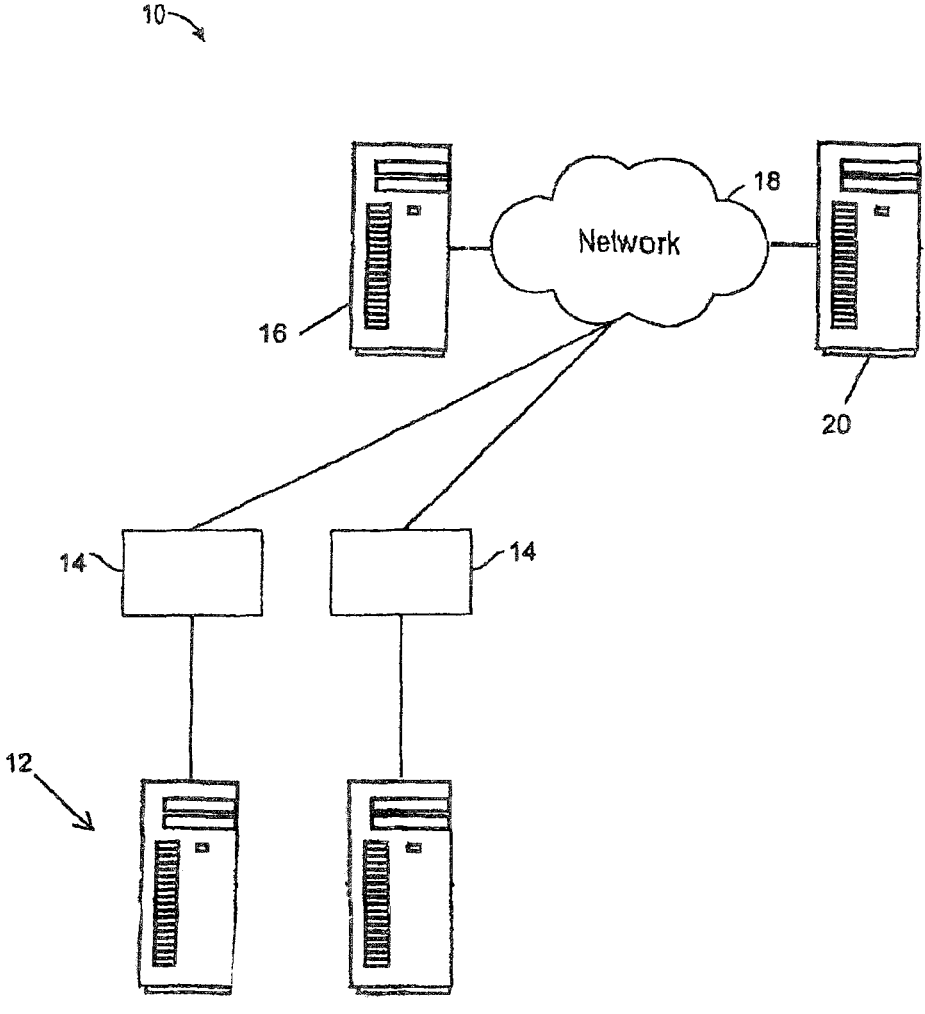
FIG. 1 is an exemplary embodiment of an electronic system for subdividing an unknown directory tree for execution of operations on the directories and files therein in accordance with one embodiment of the present application.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Specific embodiments of the invention will now be described in detail with reference to the accompanying figures. Like elements in the figures are denoted by like reference numerals for consistency.

In the following detailed description of embodiments of the invention, numerous specific details may be set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more novel electronic file and object analysis and management systems and methods of operating such novel systems. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

Moreover, for the purpose of describing the invention, an "electronic system," a "computing unit," and/or a "main computing unit" are each defined as electronic-circuit hardware device, such as a computer system, a computer server, a data storage unit, or another electronic-circuit hardware unit controlled, managed, and maintained by a file migration module, which is executed in a CPU and a memory unit of the electronic-circuit hardware device for the electronic file migration management.

In addition, for the purpose of describing the invention, a term "computer server" is defined as a physical computer system, another hardware device, a software and/or hardware module executed in an electronic device, or a combination thereof. For example, in context of an embodiment of the invention, a "computer server" is dedicated to executing one or more computer programs for executing and maintaining a robust and efficient file and object management system among varieties of storage systems. Furthermore, in one embodiment of the invention, a computer server is connected to one or more data networks, such as a local area network (LAN), a wide area network (WAN), a cellular network, and the Internet.

Without loss of generality, the terms for files and objects can be considered interchangeable, and the terms for file systems and object stores can be considered interchangeable.

Referring to FIG. 1, a system 10 may be seen. The system 10 may be configured for subdividing an unknown tree for execution of operations by multiple computer engines. The components of the system 10 may be coupled through wired or wireless connections.

The system 10 may have one or more computing engines 12. The computing engines 12 may be a client computer system such as a desktop computer, handheld or laptop device, tablet, mobile phone device, server computer system, virtual server computer system, multiprocessor system, microprocessor-based system, network PCs, and distributed cloud computing environments that include any of the above systems or devices, and the like. The computing engine 12 may be described in the general context of computer system executable instructions, such as program modules, being executed by a computer system as may be described below.

The computing engines 12 may be loaded with an operating system 14. The operating system 14 of the computing engine 12 may manage hardware and software resources of the computing engine 12 and provide common services for computer programs running on the computing engine 12.

The computing engines 12 may be coupled to a computer server 16 (hereinafter server 16). The server 16 may be used to store data files, programs and the like for use by the computing engines 12. The computing engines 12 may be connected to the server 16 through a network 18. The network 18 may be a local area network (LAN), a general wide area network (WAN), wireless local area network (WLAN) and/or a public network. In accordance with one embodiment, the computing engines 12 may be connected to the server 16 through a network 18 which may be a LAN through wired or wireless connections.

The system may have one or more additional servers 20. The servers 20 may be coupled to the server 16 and/or the computing devices 12 through the network 18. The network 18 may be a local area network (LAN), a general wide area network (WAN), wireless local area network (WLAN) and/or a public network. In accordance with one embodiment, the server 16 may be connected to the servers 20 through the network 18 which may be a WAN through wired or wireless connections.

The servers 20 may be used for analysis and storage of data. The server 20 may be any data storage devices/system. In accordance with one embodiment, the server 20 may be cloud data storage. Cloud data storage is a model of data storage in which the digital data is stored in logical pools, the physical storage may span multiple servers (and often locations), and the physical environment is typically owned and managed by a third-party hosting company. However, as defined above, cloud data storage may be any type of data storage device/system.

Figure 2:
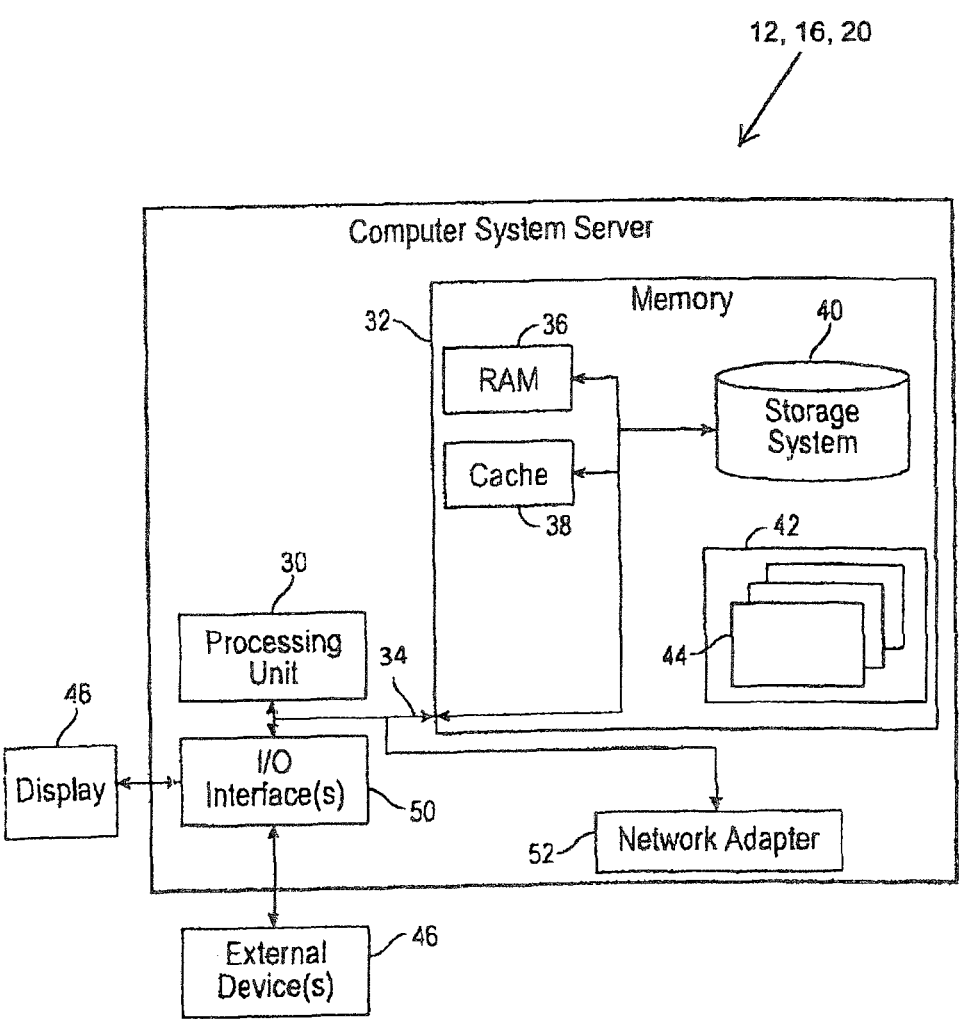
FIG. 2 an exemplary embodiment of a computer engine used in the electronic system of FIG. 1 in accordance with one embodiment of the present application.

Referring now to FIG. 2, the computing devices 12 and/or servers 16, 20 may be described in more detail in terms of the machine elements that provide functionality to the systems and methods disclosed herein. The components of the computing devices 12 and/or servers 16, 20 may include, but are not limited to, one or more processors or processing units 30, a system memory 32, and a system bus 34 that couples various system components including the system memory 32 to the processor 30. The computing devices 12 and/or servers 16, 20 may typically include a variety of computer system readable media. Such media may be chosen from any available media, including non-transitory, volatile and non-volatile media, removable and non-removable media. The system memory 32 could include one or more personal computing system readable media in the form of volatile memory, such as a random-access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein.

The computing device 12 and/or servers 16, 20 may communicate with one or more external devices 46 such as a keyboard, a pointing device, a display 48, or any similar devices (e.g., network card, modem, etc.). The display 48 may be a Light Emitting Diode (LED) display, Liquid Crystal Display (LCD) display, Cathode Ray Tube (CRT) display and similar display devices. The external devices 46 may enable the computing devices 12 and/or servers 16, 20 to communicate with other devices. Such communication may occur via Input/Output (I/O) interfaces 50. Alternatively, the computing devices and/or servers 18, 20 may communicate with one or more networks 18 such as a local area network (LAN), a general wide area network (WAN), and/or a public network via a network adapter 52. As depicted, the network adapter 52 may communicate with the other components of the computing device 18 via the bus 34.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

One aspect of an embodiment of the present invention is providing a system and a related method of operation that divides unknown directory and file trees into mutually exclusive lists of tasks in order to assign the tasks to separate compute engines 12.

File and object storage systems may be organized in discrete units such as file system shares or object store buckets. If the size of these is small and the number is large, work to be performed on them can be distributed across compute engines by simply distributing the shares or buckets across the compute engines 12. However, if the size of the shares or buckets is large, or if the number of the shares or buckets is small, or if the variance in the size of the shares or buckets is high, distributing them across the compute engines 12 will generally not result in the most efficient distribution of the total work. In these cases, dividing each share or bucket and distributing the subdivisions may result in a more efficient distribution of the work and a quicker time to completion of the total work on a particular set of compute engines 12.

Figure 3:
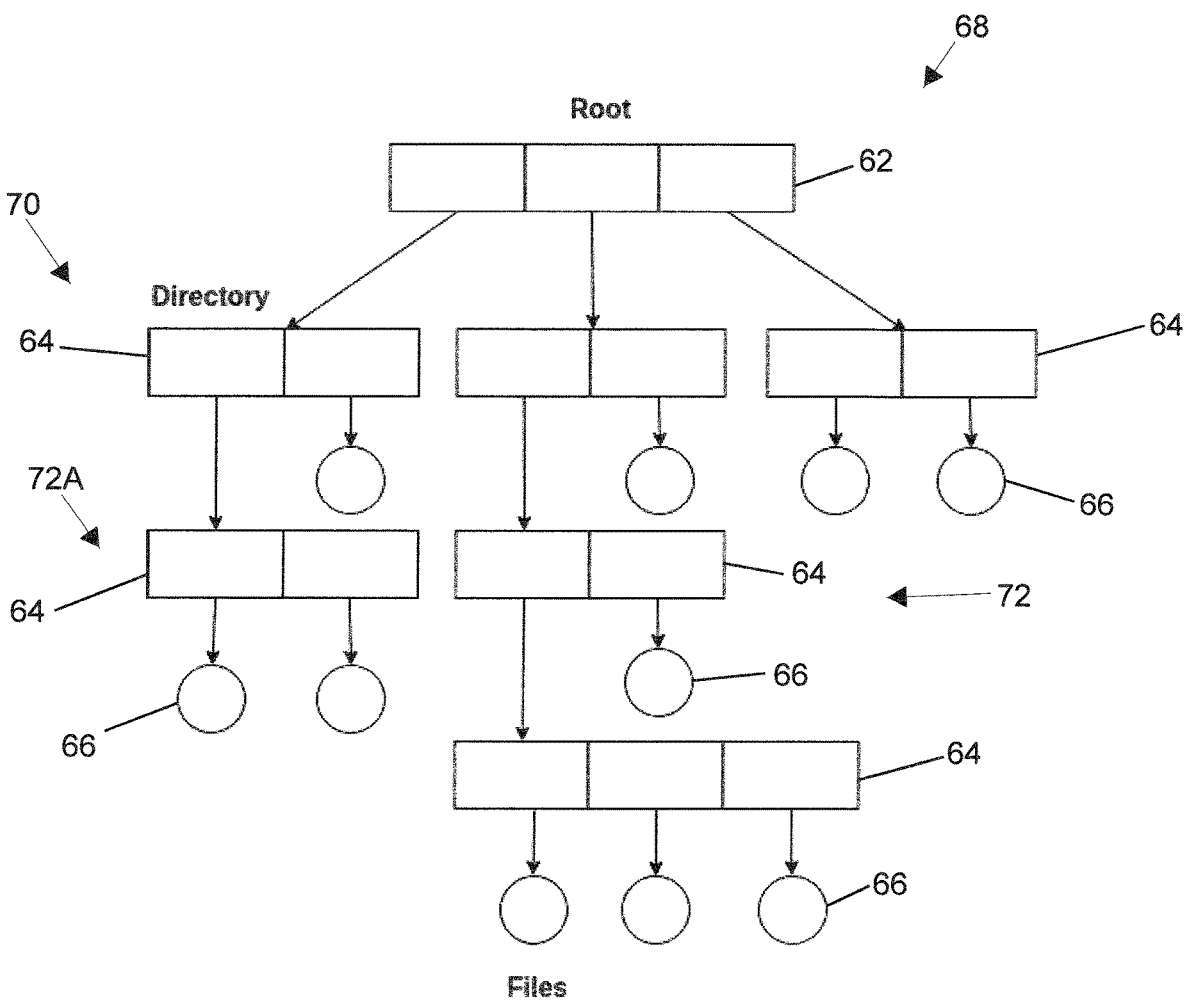
FIG. 3 is an exemplary embodiment of a tree directory used in the electronic system of FIG. 1 in accordance with one embodiment of the present application.

Referring to FIG. 3, without loss of generality, one can consider a single large file system share 60 composed of directories 64 and files 66. The same aspects of the embodiments of the present invention apply to a single large object store bucket composed of prefixes and objects and any number of any size of shares and buckets.

The file system share 60 may comprise a tree of directories 64, each of which may contain files 66. If the structure of the tree is not known in advance, it is not possible to evenly subdivide the directory tree in advance among an arbitrary number of compute engines. This embodiment of the present invention subdivides the directory tree while discovering it. The directory tree may be subdivided based on size or other operating factors. In this embodiment of the present invention, the collection of all directories 64 and files 66 in the directory tree is recognized as an unknown sorted list 68. As the tree is traversed from the root 62, certain directories 64 and files 66 may become known. These directories 64 may provide markers 70 within the sorted list 68 of all directories 64 and files 66, markers 70 between unknown sublists 72A of directories 64 and files 66. In this embodiment, these unknown sublists 72A may be assigned to tasks that are distributed among separate compute engines 12. When a compute engine 12 exhausts a sublist 72 assigned to it, it requests another sublist 72 from one of the other compute engines 12.

Each element of the sublist 72 may be either a directory 64 or a file 66. Those elements that are files 66 may be unique and appear in only one sublist 72. Those elements that are directories 64 may represent starting points in the unknown sorted list 72 of all directories 64 and files 66. All descendants of that directory 64 may be in the unknown sorted list 72 of all directories 64 and files 66 between that directory 64 and that directory's 64 next ordered sibling. So long as the sublists 72 of directories 64 and files 66 do not break between a directory 64 and a descendent of that directory 64, the sublists 72 are mutually exclusive and can be assigned to separate compute engines 12 without conflict. Furthermore, the sublists 72 may be ordered, in that every directory 64 is visited before its descendent directories 64 and files 66, and therefore operations that require prefix or postfix handling of directories 64 can be satisfied by the subdivisions of work.

Figure 4:
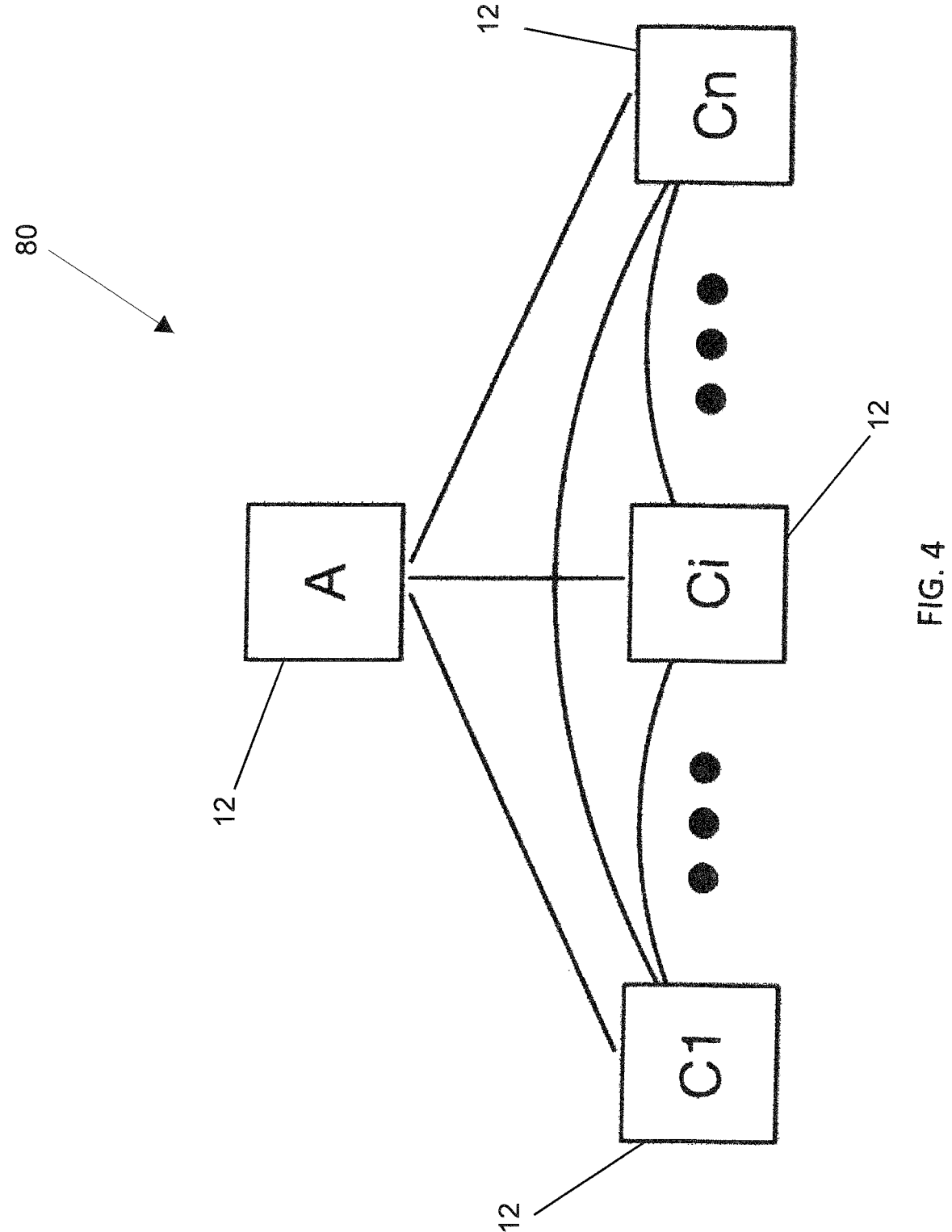
FIG. 4 is an exemplary embodiment of computer engines used in the electronic system of FIG. 1 in accordance with one embodiment of the present application.

Referring to FIG. 4, one embodiment shows an example distributed computation system 80 with a number of worker computer engines 12 labeled C1-Cn (hereinafter computer engines C1-Cn) and one computer engine 12 labeled A (hereinafter computer engine A) that is collecting the results of the work for recording and disposition. In this embodiment the computer engine A may assign the entire directory tree to one of the compute engines C1-Cn. For example, without loss of generality, the computer engine A may assign the entire directory tree to computer engine C1 Computer engine C1 may periodically communicate to computer engine A with updates of the work it is doing. This update may also include a measure of how large the list is of as yet unknown directory tree components computer engine C1 has discovered.

After a while computer engine A may requests that computer engine C1 subdivide its list of directory tree components into two or more sublists. Computer engine C1 may respond with the sublists that compute engine A can reassign to other compute engines C2 . . . Cn and retain the fully specified sublist it is currently working on for itself. These sublists may be assigned as tasks to the other computer engines C2 . . . Cn.

As a computer engine, for example Ci, finishes with its assigned task, the computer engine A may recognize that computer engine Ci has finished its task, requests that the computer engine 12 that has reported the largest list of available work, subdivide that list and return a sublist to assign to the completing computer engine Ci, and communicates that sublist to compute engine Ci.

In another embodiment of the present invention, the communication for subdividing sublists could also occur entirely among the computer engines C1 . . . Cn without involving compute engine A.

This process may continue within an embodiment of the present invention until the entire directory tree is discovered and dynamically subdivided among the computer engines C1 . . . Cn and all operations on the directories and files are finished.

Another aspect of an embodiment of the present invention recognizes differences in the amount of work to be done for each sublist and differences in the capability of each computer engine C1 . . . Cn and load balances the sublists among the compute engines C1 . . . Cn accordingly. Note that, depending on operation, this balancing should be cognizant of aspects in the sublists such as the number of files and the size of files and must be cognizant of aspects in the computer engines C1 . . . Cn such as the number of compute processors, the amount of memory, or the network bandwidth.

Another aspect of an embodiment of the present invention distributes the sublists of the directory tree to multiple computer engines C1 . . . Cn in order to analyze the metadata of the directories and files. While computer engines C1 . . . Cn are listed, it could be any number of these computer engines C1 . . . Cn. This aspect of this embodiment of the present invention requires that the means of subdividing the directory tree be very efficient. In particular, since analysis of directory and file metadata and discovery of directories and files often require the same operations on the file server, discovering the directory tree in an earlier step and subdividing it in a later step is counterproductive. Subdividing the tree efficiently is generally required.

Another aspect of an embodiment of the present invention distributes the sublists of the directory tree to the several computer engines C1 . . . Cn in order to analyze the data of the directories and files through mechanisms such as reading in-file metadata or full-file indexing. While computer engines C1 . . . Cn are listed, it could be any number of these computer engines C1 . . . Cn.

Another aspect of an embodiment of the present invention distributes the sublists of the directory tree to multiple compute engines C1 . . . Cn in order to analyze the metadata and data of the directories and files and store the results as per-file and per-directory records in a database. While computer engines C1 . . . Cn are listed, it could be any number of these computer engines C1 . . . Cn.

Another aspect of an embodiment of the present invention distributes the sublists of the directory tree to multiple compute engines C1 . . . Cn in order to copy the directories and files to another share. While computer engines C1 . . . Cn are listed, it could be any number of these computer engines C1 . . . Cn.

Another aspect of an embodiment of the present invention distributes the sublists of the directory tree to multiple compute engines C1 . . . Cn in order to move the directories and files to another share. While computer engines C1 . . . Cn are listed, it could be any number of these computer engines C1 . . . Cn.

Another aspect of an embodiment of the present invention distributes the sublists of the directory tree to multiple compute engines C1 . . . Cn in order to delete the directories and files. While computer engines C1 . . . Cn are listed, it could be any number of these computer engines C1 . . . Cn.

Another aspect of an embodiment of the present invention distributes the sublists of the directory tree to multiple compute engines C1 . . . Cn in order to move the files and leave dynamic links in the style of U.S. Pat. No. 10,198,447 which is hereby incorporated by reference. While computer engines C1 . . . Cn are listed, it could be any number of these computer engines C1 . . . Cn.

Another aspect of an embodiment of the present invention distributes the sublists of the directory tree to multiple compute engines C1 . . . Cn in order to perform an arbitrary operation typical for directories and files on the directories and files in the sublists. While computer engines C1 . . . Cn are listed, it could be any number of these computer engines C1 . . . Cn.

The foregoing description is illustrative of particular embodiments of the application, but is not meant to be a limitation upon the practice thereof. The following claims, including all equivalents thereof, are intended to define the scope of the application.

What is claimed is:

1. An electronic system for executing operations on directories and files in a file system comprising:
  a plurality of computer engines, wherein each computer engine comprises:
  a processor;
  a memory coupled to the processor, the memory storing program instructions;
  wherein the program instructions when executed by a first processor of a first computer engine of the plurality of computer engines, causes the first processor of the plurality of computer engines to:
  store a corresponding sorted list of directories;
  traverse over the corresponding sorted list of directories, wherein known directories of the corresponding sorted list of directories become markers between unknown sublists of directories and files, wherein each corresponding unknown sublist of directory and files in the corresponding unknown sublist of directory are mutually exclusive;
  execute a designated operation on each known directory and files in each known directory;
  divide the corresponding sorted list of directories into least two parts, wherein at least one of the two part contains a portion of the unknown sublists of directories and files;

assigning the portion of the unknown sublist a second computer engine from the plurality of computer engines; and communicate to the second computer engine when no more directories in the sorted list of directories remain;

wherein the program instructions when executed by the processor of the second computer engine from the plurality of computer engines causes the processor of the second computer engine to:

receive the portion of the unknown sublist assigned from the first computer engine;

execute a designated operation on the portion of the unknown sublist assigned from the first computer engine;

communicate to the first computer engine a status of the designated operation on the portion of the unknown sublist assigned; and communicate to the first computer engine when the designated operation on the portion of the unknown sublist assigned is finished.

2. The electronic system of claim 1, wherein the memory storing program instructions that when executed by the processors of the first and second compute engines, causes each processor the first and second computer engines to analyze metadata of the directories and files forming a respective subtask being analyzed by a corresponding one of the first and second computer engines.

3. The electronic system of claim 1, wherein the memory storing program instructions that when executed by the processors of the first and second computer engines, causes each processor of the first and second engines to analyze in-file metadata or full-file content of the files forming a respective subtask being analyzed by a corresponding one of the first and second computer engines.

4. The electronic system of claim 3, wherein the analyze metadata of the directories and files forming the respective subtask is stored in a database.

5. The electronic system of claim 1, wherein the memory storing program instructions that when executed by the processors of the first and second compute engines, causes the processors of the first and second computer engines to copy corresponding directories and files to a different file system.

6. The electronic system of claim 1, wherein the memory storing program instructions that when executed by the processors of the first and second computer engines, causes the processors of the first and second computer engines to move corresponding directories and files to a different file system.

7. The electronic system of claim 1, wherein the memory storing program instructions that when executed by the processors of the first and second computer engines, causes the processors of the first and second computer engines to perform any file management operations to corresponding directories and files.

8. The electronic system of claim 1, wherein the memory storing program instructions that when executed by the processors of the first and second computer engines, causes the processors of the first and second computer engines to move and link corresponding directories and files.

9. The electronic system of claim 1, wherein the program instructions when executed by the processor of the second computer engine from the plurality of computer engines causes the processor of the second computer engine to request to the first computer engine additional unknown sublists when the designated operation on the portion of the unknown sublist assigned is finished.

* * * * *